United States Patent [19]

Isaksen et al.

[11] Patent Number: 4,588,627
[45] Date of Patent: * May 13, 1986

[54] DEFLECTOR FOR VEHICLE BODY COMPONENTS

[75] Inventors: Robert A. Isaksen, Chardon; David E. Frappier, Chagrin Falls; Wallace R. Jones, Waite Hill Village, all of Ohio

[73] Assignee: The Excello Specialty Company, Cleveland, Ohio

[*] Notice: The portion of the term of this patent subsequent to Sep. 4, 2001 has been disclaimed.

[21] Appl. No.: 606,900

[22] Filed: May 3, 1984

Related U.S. Application Data

[63] Continuation-in-part of Ser. No. 415,228, Sep. 7, 1982, Pat. No. 4,469,732.

[51] Int. Cl.$^4$ .............................. B32B 3/02; B32B 3/10
[52] U.S. Cl. ..................................... 428/80; 296/39 R; 428/131; 428/187; 428/192; 428/194; 428/195; 428/343; 428/352

[58] Field of Search ................ 428/195, 194, 343, 80, 428/352, 192, 187, 31, 40; 206/18.11; 264/22

[56] References Cited

U.S. PATENT DOCUMENTS

| | | | |
|---|---|---|---|
| 2,801,447 | 8/1957 | Wolinski | 264/22 |
| 3,067,057 | 12/1962 | Dabroski | 428/352 |
| 3,464,842 | 9/1969 | Jackstadt | 428/195 |
| 3,730,942 | 5/1973 | Green et al. | 106/18.11 |
| 4,430,289 | 2/1984 | McKinney et al. | 524/445 |
| 4,469,732 | 9/1984 | Isaksen et al. | 428/80 |

*Primary Examiner*—Paul J. Thibodeau
*Attorney, Agent, or Firm*—Fay, Sharpe, Fagan, Minnich & McKee

[57] ABSTRACT

A deflector for securement to body components of a vehicle to prevent water, dust, and the like from entering the body or wetting inner trim panels. The deflector comprises a sheet of plastic peripherally shaped for covering at least a predetermined portion of a body component, and having permanently plastic and permanently tacky pressure-sensitive adhesive on selective areas thereof for attaching the sheet to the component.

34 Claims, 6 Drawing Figures

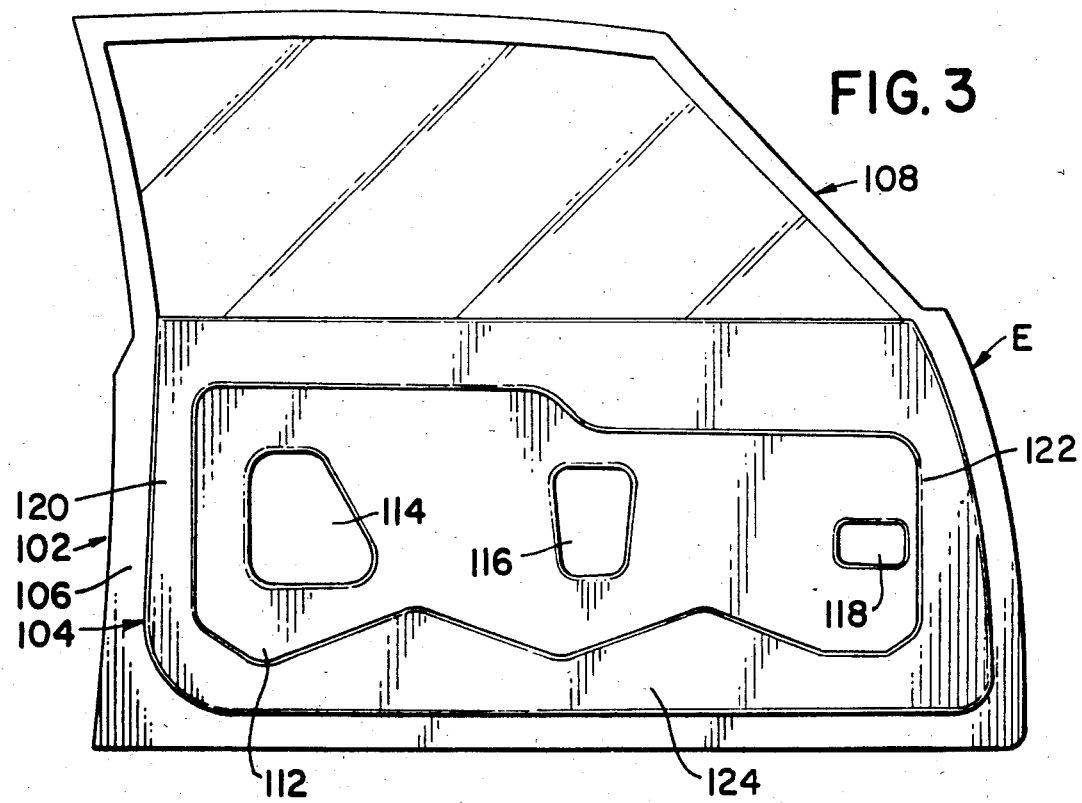
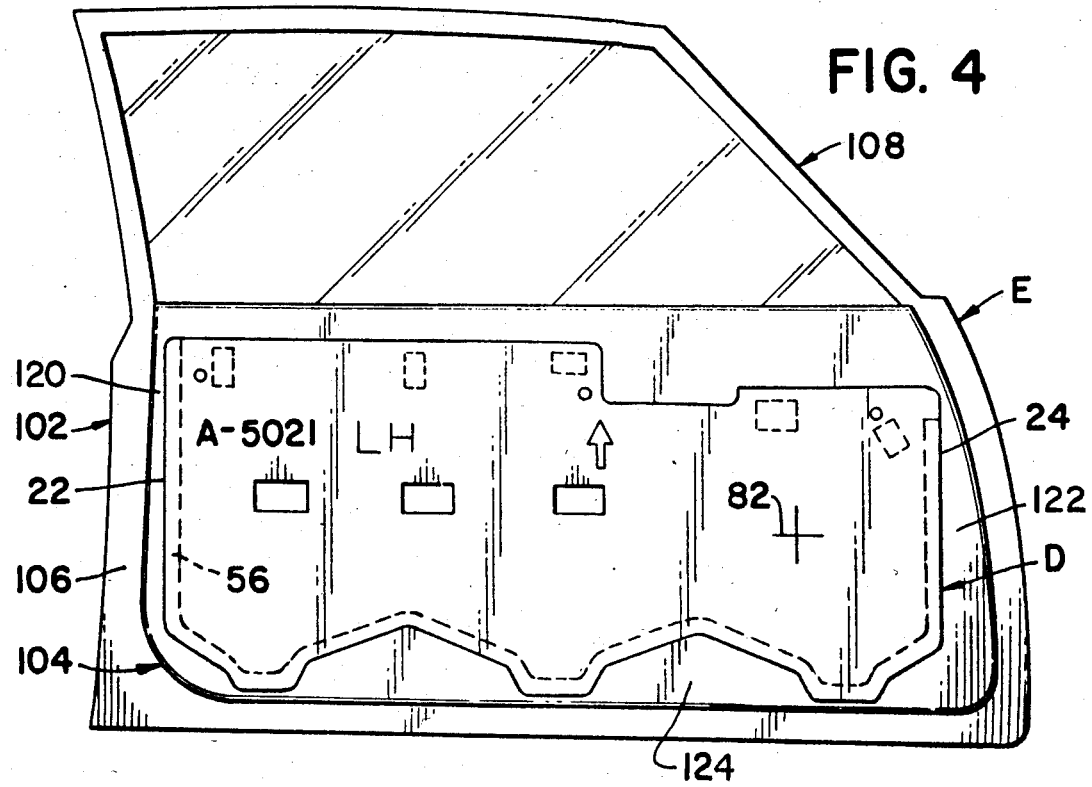

DEFLECTOR FOR VEHICLE BODY COMPONENTS

This application is a continuation-in-part of application Ser. No. 415,228, field Sept. 7, 1982, now U.S. Pat. No. 4,469,732.

BACKGROUND OF THE INVENTION

This application relates to the art of deflectors and, more particularly, to water and dust deflectors for application to body components of vehicles. While the invention will be described with particular reference to inner panels for vehicle doors, the invention is equally applicable to use with other vehicle components such as floor pans and the like.

The metal inner panel of a vehicle door has a plurality of openings and holes therein for mounting certain accessories and mechanisms in the door, and for providing access to such accessories and mechanisms. By way of example, the inner panel of a vehicle door may have openings and holes for mounting such items as window operating mechanisms, locks, and remote mirrors. Openings may also be provided for radio speakers. The door inner panels for each vehicle body style are normally provided with the same openings and holes so that all of the panels may accommodate the full range of standard and optional equipment which may be housed or included in the doors.

A decorative trim panel and arm rest are conventionally applied over the inner panel of a vehicle door and it is common to apply a water deflector over the inner door panel for substantially closing the various openings and holes therein for preventing entry of water, or dust and the like, into the vehicle body or interior door trim. Heretofore, the normal practice has been to secure a substantially waterproof paper over the inner door panel by using waterproof tape, body sealer compound, or caulking compound. A paper water deflector such as the foregoing has a propensity to tear during handling, particularly if repairs are required on the vehicle door. In addition, the various waterproof tapes, body sealer compounds, and caulking compounds are very time consuming to apply during initial assembly of the vehicle or when subsequent repairs are required. In addition, removal of the tape and breaking the bond of the sealer or caulking compound often damages the water deflector and also requires application of new sealing compound for reattaching the deflector.

It has, therefore, been considered desirable to provide an improved water deflector which would not be easily torn, and which would not require the use of tape or individual application of caulking compounds thereto for attaching same to a door inner panel, as well as other body panels or components.

BRIEF SUMMARY OF THE INVENTION

A deflector for vehicle panels or components comprising a flat and flexible sheet of plastic material such as vinyl or polyethylene having a thickness of approximately between 4-10 mils. The plastic sheet is preferably transparent or slightly translucent.

The plastic sheet is peripherally shaped for covering at least a predetermined portion of a vehicle panel by cooperating with the particular peripheral configuration of the particular panel involved. On one face of the sheet, and being disposed in strips generally along the edges of the sheet, is a permanently deformable or plastic and permanently tacky pressure-sensitive adhesive. In the case of the metal inner panel of a vehicle door, the adhesive strip is continuous along the side edges of the sheet and substantially continuous along the bottom edge. This allows substantial sealing of the sheet along its bottom edge and along a substantial length of it side edges to corresponding flat surfaces on the door inner panel. Additional adhesive material may be applied to the sheet adjacent the upper edge thereof for holding same against the inner panel.

At least one tab may be provided along an edge of the sheet. The tab is insertable into a slot in the vehicle panel, and a strip of plastic tape-like material can be secured over the tab for tightness. In the case of an inner door panel, the tab preferably is provided along the bottom edge of the sheet for insertion into a slot in the door panel itself.

The plastic sheet may have orientation indicia thereon in the form of an arrow or the like for indicating the upper edge portion of the sheet. In addition, the sheet may have location indicia thereon for indicating placement of the sheet during installation. The plastic sheet may further advantageously include a seller or purchaser part number.

The adhesive material is preferably opaque or otherwise distinctly colored to offset same from the plastic sheet. The plastic sheet may also have a plurality of spaced alignment holes therein for receiving pins to register a plurality of stacked sheets prior to die cutting of same to the desired shape. During die cutting, the plastic sheets may also have a plurality of holes or slits formed therein for allowing passage of various fasteners or mechanisms therethrough from an associated vehicle panel.

The sheets with the adhesive applied thereto are preferably baked in an oven at an elevated temperature to firmly bond the adhesive to the sheets, and to partially cure the adhesive.

The surface of the plastic sheet to which the adhesive is applied may be treated for enhancing adhesion of the adhesive thereto. The plastic sheet is either flame retardant or includes a flame retardant agent. A slip agent may also be provided to facilitate separation of the stacked sheets subsequent to die cutting.

It is a principal object of the invention to provide an improved water and dust deflector for covering components of vehicle bodies.

It is an additional object of the invention to provide such a deflector with permanently plastic and permanently tacky pressure-sensitive adhesive for securing same to an associated vehicle component.

It is also an object of the invention to provide an improved procedure for manufacturing such deflectors.

Still other objects and advantages for the invention will become apparent from those skilled in the art upon a reading and understanding of the following detailed description.

BRIEF DESCRIPTION OF THE DRAWINGS

The invention may take form in certain parts and arrangements of parts, preferred embodiments of which will be described in detail in this specification and illustrated in the accompanying drawings which form a part hereof and wherein:

FIG. 3 is a diagrammatic elevational view of the inner panel of a vehicle door;

FIG. 4 is a view similar to FIG. 3 showing the deflector of FIG. 2 applied to the inner panel of the vehicle door in FIG. 3;

DESCRIPTION OF THE PREFERRED EMBODIMENTS

Figure 1:
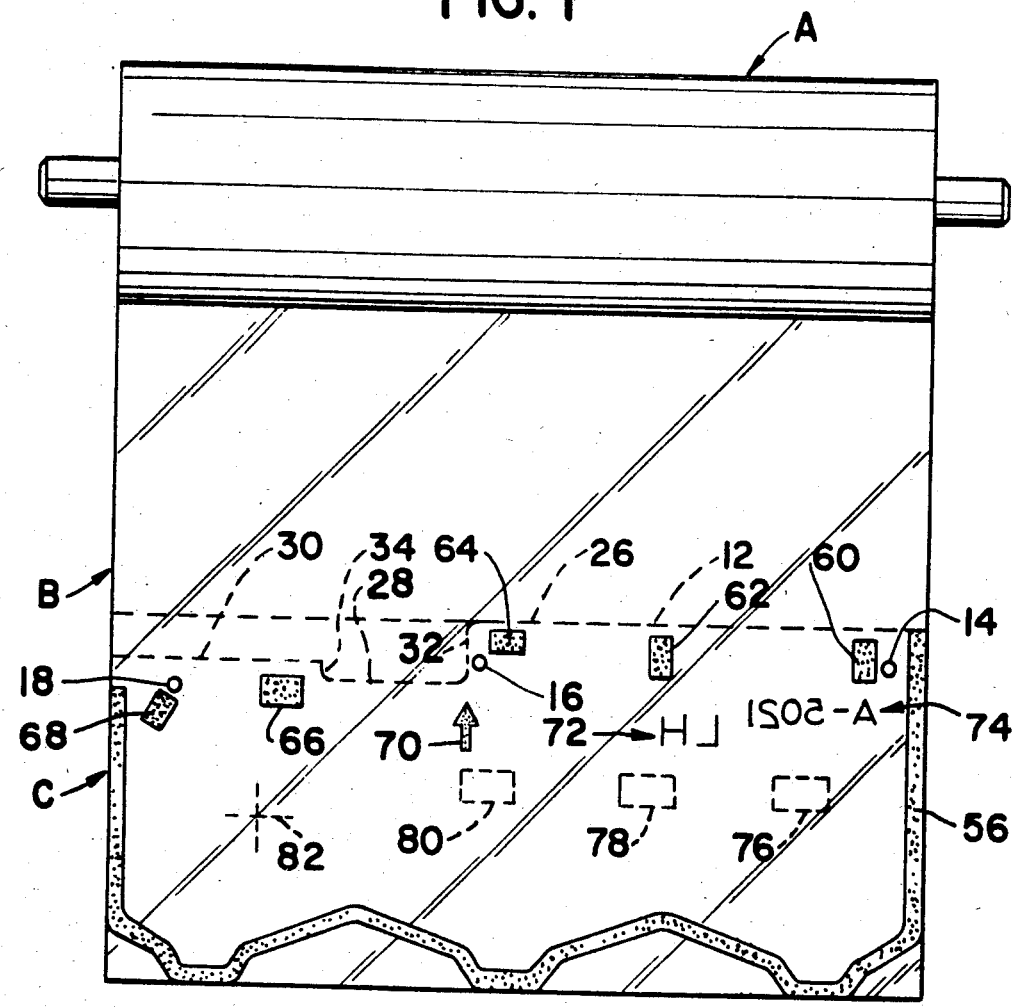
FIG. 1 is a plan view of a plastic sheet being unrolled and having an adhesive applied thereto in a predetermined configuration for use of the sheet in cut lengths as a water or dust deflector in vehicle doors.

Referring now to the drawings, wherein the showings are for purposes of illustrating preferred embodiments of the invention only and not for purposes of limiting same, FIG. 1 shows a roll A of plastic film being unwrapped to provide an elongated flat sheet B of synthetic plastic material. Although it will be recognized that different types of synthetic plastic material may be used for certain purposes, it has been found that polyethylene is one preferred material for the deflector because of its high strength, flexibility, and durability. For use as a deflector in vehicle doors, it has been found that polyethylene film having a thickness of approximately between 6-10 mils offers optimum strength, flexibility, and durability at minimum cost.

The polyethylene film preferably has a suitable flame retardant incorporated therein. The flame retardant may be any of well-known types including organic or inorganic, or combinations thereof. In addition, the polyethylene film preferably has a suitable slip agent incorporated therein, such as an amide wax. The slip agent facilitates separation of stacked water deflectors for installation on a vehicle door. One surface of the polyethylene film is also treated for modifying the surface characteristics to enhance bonding of an adhesive thereto. Although chemical and flame treatments are possible, it has been found that the corona discharge treatment is the preferred procedure and provides optimum results.

An adhesive in a liquid or semi-liquid state is applied to the treated surface of sheet B in a predetermined pattern. The adhesive is applied so it has a substantially uniform thickness which is substantially less than the thickness of sheet B. The adhesive may be of any suitable type so long as it provides substantially permanently tacky pressure-sensitive characteristics. The adhesive may be solvent based, including, but not necessarily limited to, neoprene, rubber lattices or butyral phenolic.

Plastic sheet B is characterized by the absence of color or is of a color distinctly different from the color of the adhesive. Plastic sheet B is cut along line 12 to provide a water deflector blank C having the adhesive applied to the treated surface thereof. A plurality of spaced-apart registration holes 14, 16, and 18 are provided in the blank for receiving pins so that a plurality of blanks can be stacked in registration with one another for die cutting. Blanks C are baked in an oven at an elevated temperature for securely bonding the adhesive to the surface of the plastic and for partially curing the adhesive by driving off the solvent. The adhesive is then substantially permanently tacky or sticky to provide pressure-sensitive characteristics, and is tenaciously bonded to the surface of the plastic sheet.

Figure 2:
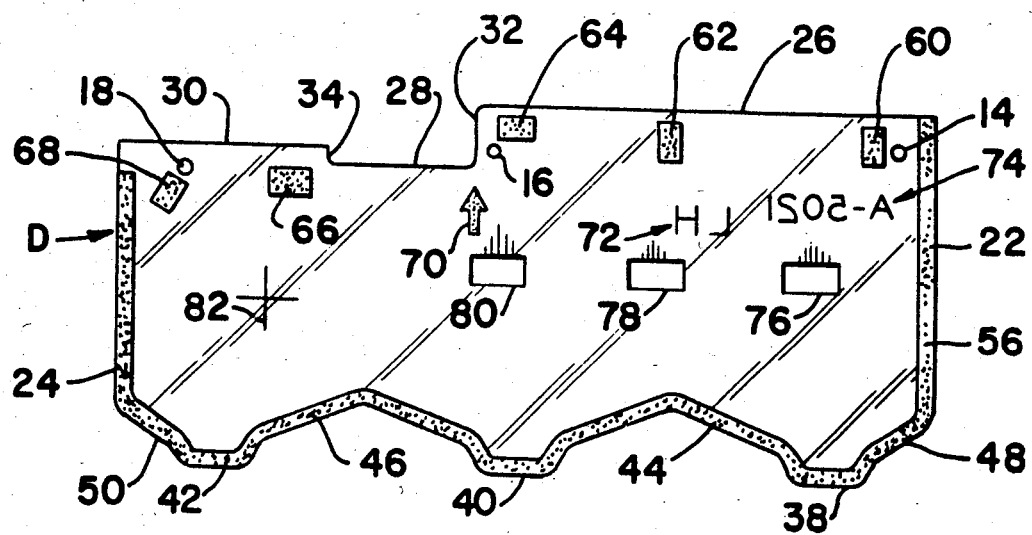
FIG. 2 is a plan view of a sheet of plastic material for use as a water or dust deflector in a vehicle door in accordance with one preferred embodiment of the invention subsequent to trimming of the plastic sheet.

Subsequent to baking, a plurality of the water deflector blanks are stacked on top of one another with the adhesive patterns on adjacent sheets being in registration with one another. The desired registration is obtained by placing the blanks onto locating pins which extend upwardly through registration holes 14, 16, and 18. The stacked blanks are then die cut to the peripheral configuration shown in FIG. 2 for defining a plurality of finished water deflectors D. It will be recognized that the shape or peripheral configuration of the water deflectors will vary depending on the particular type or style of vehicle on which it will be used. In the stack of water deflectors, the adhesive on one sheet faces the untreated surface of an adjacent sheet.

Untreated surface refers to the surface of each deflector which has not been treated for enhancing bonding of adhesive thereto. In addition, the slip agent blooms to that untreated surface so that the adhesive does not stick tenaciously to the surface of an adjacent sheet. Thus, the sheets are relatively easily separated one at a time from the stack for application to a vehicle door.

Still further, a predetermined number of deflectors, typically 25 to 50, which comprise a stack may be provided with a cardboard or like bottom sheet to form a pad-like arrangement. Individual deflectors may be removed from the pad on an as needed basis and the pad-like arrangement accommodates safe storage of the unused ones of the deflectors.

Water deflector D has generally parallel opposite side edges 22,24. The top edge of water deflector D is staggered and defined by generally parallel edges 26,28 and 30 which are vertically offset from one another. Connecting edges 32,34 connect top edges 26,28 and 28,30, respectively. The bottom edge of water deflector D is somewhat scalloped and includes a plurality of aligned spaced-apart lowermost bottom edges 38,40, and 42. Upwardly sloping bottom edge portions 44,46 connect lowermost bottom edges 38,40 and 40,42, respectively. Upwardly sloping bottom edges 48,50 connect lowermost bottom edges 38,42 with side edges 22,24, respectively.

Adhesive 56 is applied continuously along the treated surface of the sheet which forms water deflector D adjacent the bottom edge thereof and extends continuously upwardly along opposite sides edges 22,24. Adhesive material 56 extends upwardly over a major portion of the length of side edges 22,24. In the arrangement shown, the adhesive extends the full length of side edge 22 and just slightly less than the full length of side edge 24. The adhesive is applied in the form of a strip or ribbon of substantial width, preferably at least one-half inch wide. Also, adhesive 56 has a thickness substantially less than that of the plastic film and extends completely to the edges of the water deflector instead of being spaced inwardly therefrom.

Although the preferred arrangement shows adhesive in a continuous band along the bottom edge of the deflector, it is sometimes considered desirable to provide a discontinuous adhesive band therealong. This, then, provides relief areas which aid in eliminating any creases during deflector installation. In the particular embodiment of the deflector shown in FIGS. 1-4, the areas which would not be provided with adhesive comprise lowermost bottom edges 38,40,42. These edges or flap-like areas would simply be tucked into adjacent openings in a door inner panel and thus provide a shingle-like effect for water penetrating the area between the door inner and a door outer panel. Of course, the placement of the adhesive band along the deflector lower edge could be varied as necessary and/or appropriate to accommodate different door and deflector designs.

Spaced-apart generally rectangular areas of adhesive are applied to the treated surface of the water deflector sheet adjacent the top edge thereof as at, for example, the areas designated 60, 62, 64, 66, and 68. Registration holes 14 and 18 are shown as preferably being located adjacent the intersection of side edges 22,24 with the top edge of the sheet. Registration hole 16 is shown as being located adjacent the intersection of top edge 26 with connecting edge 32. Moreover, registration holes 14, 16, and 18 are all preferably spaced from the adhesive material. It will be appreciated, however, that the registration holes may be placed in other locations to suit particular needs.

Adhesive material is also advantageously applied to the treated surface of the sheet in the form of an arrow 70 to provide orientation indicia informing an installer which edge comprises the top or upper one. Adhesive may also be applied to the treated surface of the sheet in the form of location indicia 72 indicated as the letters "LH" to indicate that the water deflector is for use on a left hand door. Still further, adhesive may also be applied to the treated surface of the sheet in the form of letters and numbers 74 to identify the part number of the water deflector or the part number of the door inner with which the deflector is to be associated.

A plurality of spaced-apart openings 76,78 and 80 may be die cut in water deflector D for accommodating fasteners or the like used, for example, to secure the inner door trim panel in place. A cross slit 82 may also be die cut in the sheet for accommodating a window operator or the like. It is desirable that all inner corners of such die cut openings and intersections of edges be smoothly curved to avoid high stress concentrations which might otherwise result in undesired tearing of the sheet.

FIG. 3 shows a typical vehicle door E having outer and inner metal door panels 102,104 secured together with a space therebetween for accommodating various mechanisms. Only the peripheral portion of outer door panel 102 is visible in FIG. 3 at numeral 106. A window 108 is shown for door E and moves into the space defined between the inner and outer door panels in a known manner. Inner door panel 104 is stamped into an irregular or uneven contour for accommodating the mounting of various mechanisms or accessories thereon and for providing optimum strength. A dished-in area of inner door panel 104 is generally indicated at 112 in FIG. 3 and a plurality of relatively large openings 114,116 and 118 are formed therein for mounting various items or providing access to mechanisms. While three such openings have been shown by way of example in FIG. 3, it will be appreciated that a greater number are typically present. A plurality of small holes, indentations, and the like (not shown) are also normally provided in the inner door panel for accommodating screws, bolts, and other components in a known manner. At least the opposite side peripheral portions 120,122 along with the bottom peripheral portion 124 of inner door panel 104 are substantially flat and planar.

Water deflector D is peripherally shaped to substantially cover inner door panel 104 and to substantially match or cooperate with the opposite side and bottom flat peripheral portions. FIG. 4 shows water deflector D in an adhesively secured relationship to inner door panel 104. The continuous adhesive ribbon along the bottom and opposite side edges of water deflector D firmly adheres to bottom flat portion 124 and opposite flat side portions 120,122 on inner door panel 104. The upper edge of bottom flat area 124 on inner door panel 104 is scalloped where it intersects dished-in portion 112, and the scalloped bottom edge of water deflector D generally corresponds with the scalloped shape of the line at the intersection between dished-in area 112 and bottom flat area 124.

In particular application, deflector D functions to deflect water entering the space between the inner and outer door panels. The water is thus kept within the door assembly for drainage out through conventional bottom drain openings instead of entering the vehicle body or wetting the inner door trim panel. The upper edge portion of the water deflector is held to the inner door panel by the spaced adhesive areas 60, 62, 64, 66, and 68. The various adhesive indicia areas may be located to assist in holding the middle area of the deflector to the inner door panel.

Because of the special corona treating process which the plastic receives and because of the baking process which is employed after the adhesive is applied to the plastic, the adhesive tenaciously adheres to the plastic. Accordingly, and in the event the water deflector must be removed from association with the door inner panel for some reason such as making door repairs or the like, the adhesive does not have a tendency to pull away from the plastic and remain with the door inner. Rather, the adhesive remains affixed to the plastic so that the deflector may be easily reinstalled without the necessity for using any additional or new adhesive.

Another preferred material for the water deflector is polyvinyl chloride which, when heated, becomes soft and molds to the door panel better than polyethylene. Also, the vinyl does not have a tendency to expand as much as polyethylene when heated and, thus, tends to adhere better to the door in such environment. Preferably, the vinyl is approximately 4 mils in thickness.

If vinyl is used as the plastic material of the deflector, no separate flame retardant agent is necessary since the vinyl is inherently flame retardant. Also, instead of incorporating a slip agent into the plastic sheet as is done with the polyethylene material, the vinyl preferably is coated on one side with a slip agent. In this way, a slip agent may be provided between adjacent sheets of the stacked vinyl material. Moreover, in the case of vinyl, the surface to which the adhesive is applied does not need to be treated to enhance bonding of the adhesive thereto.

Figure 5:
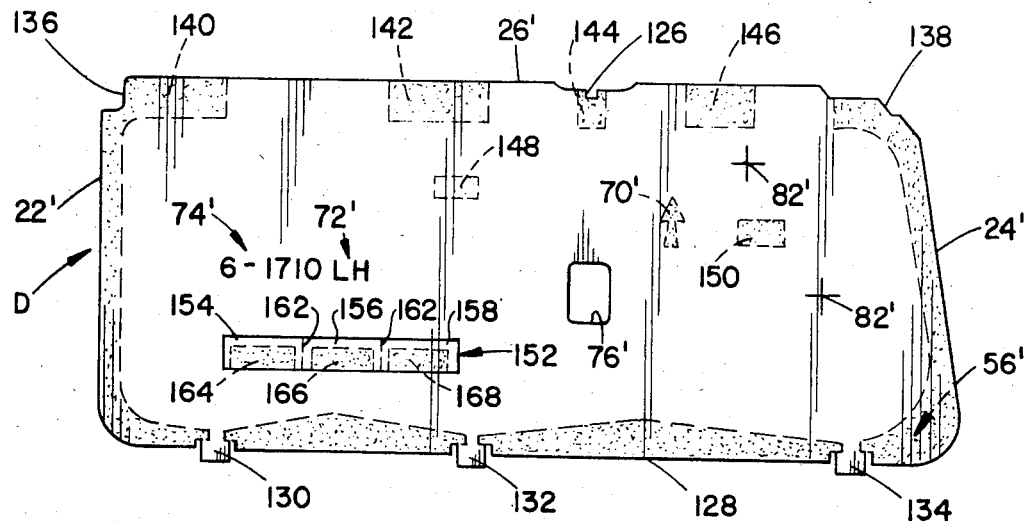
FIG. 5 is a plan view showing a deflector according to another preferred embodiment of the invention; and, FIG. 6 is a diagrammatic elevational view showing the deflector of FIG. 5 applied to the inner panel of a vehicle door.

FIG. 5 shows a second preferred embodiment of the invention. For ease of illustration in appreciating this embodiment, like components are identified by like numerals with a primed (') suffix, and new components are identified by new numerals.

More particularly, FIG. 5 shows a polyvinyl chloride sheet deflector D' having generally opposite side edges 22',24'. The top of deflector D' is substantially defined by one edge 26', although one or more identations 126 in the edge may also be provided. The bottom of deflector D' is also substantially defined by one edge 128 but is further provided with three tabs 130,132,134 which extend outwardly from the bottom edge. In this embodiment, side edges 22',24' are provided with curved bottom corners and indented top corners. Specifically, an indentation 136,138 is provided between top edge 26' and each of side edges 22',24'. It will be appreciated, however, that the specific peripheral shape of the deflector will vary depending upon the type and style of vehicle on which it will be used. Likewise, the number of tabs which may be included along deflector bottom edge 128 will vary as a function of the door design involved.

An adhesive 56' is applied continuously along a rear surface of the sheet of FIG. 5 adjacent both side edges 22',24', and in an interrupted manner along the top and bottom edges 26', 128. Preferably, adhesive 56' is applied in the form of a strip or ribbon of substantial width from the edge of the deflector sheet inwardly. Typically, this width would be on the order of magnitude of one inch or so. As with the embodiment of FIGS. 1-4, adhesive 56' has a thickness substantially less than that of the plastic film.

Along bottom edge 128, adhesive 56' is substantially continuous and is only absent at the areas of tabs 130,132,134. Spaced-apart generally rectangular areas of adhesive are also applied to deflector D' adjacent the top edge thereof as at areas 140,142,144 and 146. Also, other spaced-apart adhesive areas 148,150 may advantageously be provided spaced from the top edge.

As with the embodiment of FIGS. 1-4, adhesive material is also applied to the sheet in the form of an arrow 70' to provide orientation indicia, as well as letters 72' to provide location indicia and numbers 74' to provide part numbers. Also, an opening 76' may be provided for accommodating fasteners or the like, and one or more cross slits 82' may be provided for accommodating window operators or the like.

Figure 6:
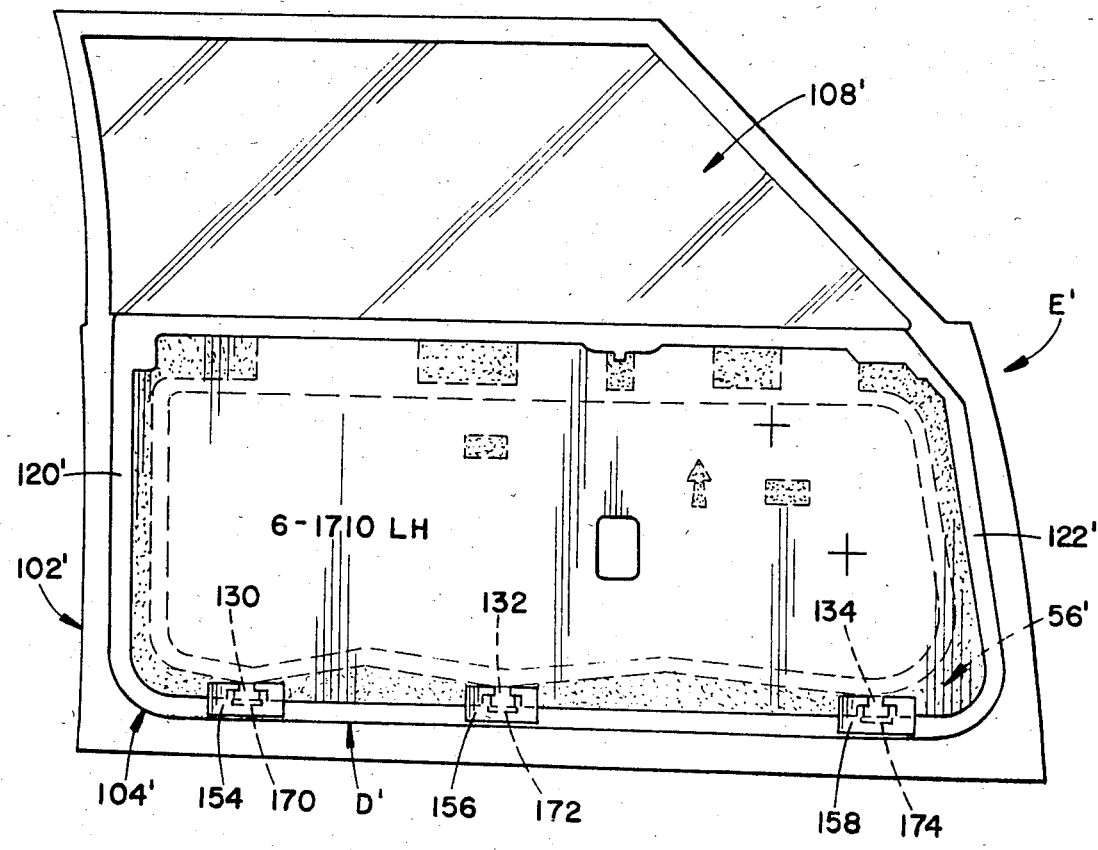

A length of a plastic tape 152, which is separated into three portions 154,156,158 by two discontinuous cut lines 162, is adhered to a front side of deflector D'. Adhesive sections 164,166,168 are provided on tape portions 154,156,158, respectively. The rear or outer side of the vinyl deflector, ie., the side which is viewed in FIGS. 5 and 6, is coated with a slip or release agent, but adhesive sections 164,166,168 of tape 152 are able to adhere to the vinyl due to the formulation of the adhesive used. The three lengths of tape 154,156,158 can be separated from each other along cut lines 162 when the tape 152 is to be used. As shown in FIG. 5, the tape 152 is in a storage position. Also, in the arrangement here under discussion, the tape is advantageously constructed from an olefin plastic material.

With reference to FIG. 6, a vehicle door E' has outer and inner door panels 102',104' which are secured together with a space being provided therebetween for accommodating various mechanisms. A window 108' can be lowered between the two panels 102',104' in the known manner. Deflector D' is peripherally shaped to substantially cover the inner door panel 104', and it is evident that this peripheral shape may have to be varied for accommodating the different types and styles of vehicle doors on which it will be used.

Adhesive 56' along the bottom and opposite side edges of the deflector will firmly adhere the sheet to bottom flat portion 124' and opposite flat side portions 120',122' on inner door panel 104'. The upper edge of the bottom flat area 124' is substantially scalloped, whereas bottom edge 128 of the deflector D' is straight. Therefore, scalloped areas of adhesive 56' generally corresponding to the door scallops are provided for securing the deflector bottom edge to the inner door panel.

As previously noted, the deflector bottom edge in the embodiment of FIGS. 5 and 6 is provided with three tabs 130,132,134. Each of these tabs, in turn, fits into one of slots 170,172,174 in the inner door panel. Slots 170,172,174 may extend outwardly from the inner door, or simply may comprise apertures which require tabs 130,132,134 to be folded for insertion into the slots.

To use tape 152, it is first detached from association with deflector D', and then separated along cut lines 162 into portions 154,156,158. One of portions 154,156,158 is then adhered over that section of the deflector where each of tabs 130,132,134 is inserted into its respective slot 170,172,174. In this manner, the bottom edge of the deflector is completely adhered to the door inner panel 104' for establishing integrity against penetration by water and dust. Alternatively, however, tape portions 154,156,158 can be eliminated in some types of door designs so that tabs 130,132,134 act in the manner of shingles as discussed above.

Although the invention has been shown and described with respect to preferred embodiments, it is obvious that modifications and alterations will occur to others upon a reading and understanding of this specification. For example, features and relationships from the embodiment of FIGS. 1-4 may be incorporated into the embodiment of FIGS. 5 and 6, and features and relationships from FIGS. 5 and 6 may be incorporated into the embodiment of FIGS. 1-4. Also, and while the invention has been described with reference to a deflector for vehicle door panels, it will be readily appreciated that it is also applicable to a variety of other body panels. It is intended to include all such modifications and alterations insofar as they come within the scope of the claims or the equivalents thereof.

Having thus described the invention, it is now claimed:

1. A reusable deflector for application to a vehicle panel to prevent water or dust from entering the vehicle body comprising:
a flat and flexible sheet of plastic material having a peripheral shape generally matching the peripheral configuration of at least some portion of a vehicle panel, said sheet having top, bottom, and opposite side edges and a single permanently tacky pressure-sensitive adhesive bonded to one face of said sheet in strips adjacent said edges and covering a minor portion of the surface of said one face.

2. The deflector as defined in claim 1 wherein said sheet is polyethylene.

3. The deflector as defined in claim 2 wherein said sheet has a slip agent incorporated therein to facilitate separation of adjacent sheets placed in a stacked relationship relative thereto.

4. The deflector as defined in claim 3 including a flame retardant incorporated in said sheet.

5. The deflector as defined in claim 2 wherein at least said one face of said sheet is treated for enhancing the bond between said adhesive and said one face.

6. The deflector as defined in claim 1 wherein said sheet is polyvinyl chloride.

7. The deflector as defined in claim 1 including indicia printed on said one face with said adhesive.

8. The deflector as defined in claim 1 wherein said vehicle panel comprises the inner panel of a vehicle door and said sheet has a peripheral shape generally matching the inner panel, said adhesive being disposed in strips adjacent said bottom edge and upwardly from said bottom edge along said side edges over a major portion of the length thereof.

9. The deflector as defined in claim 8 wherein said adhesive is in a continuous strip adjacent said bottom edge.

10. The deflector as defined in claim 8 wherein said adhesive is at spaced-apart intervals along said top edge.

11. The deflector as defined in claim 1 wherein said sheet is polyethylene having a thickness of approximately between 6-10 mils.

12. The deflector as defined in claim 1 wherein said sheet is polyvinyl chloride having a thickness of approximately 4 mils.

13. The deflector as defined in claim 1 wherein said adhesive is baked on said sheet.

14. The deflector as defined in claim 1 further including a plurality of spaced-apart pin receiving holes in said sheet generally adjacent said top edge for receiving pins to achieve registration between a plurality of like sheets stacked on top of one another.

15. A reusable deflector for application to a panel in a covering relationship with an opening therein to inhibit water or dust from passing therethrough comprising:
a flat and flexible sheet of flexible plastic material having a peripheral shape generally corresponding with the peripheral shape of the panel and having top, bottom, and opposite side edges, a single permanently tacky pressure-sensitive adhesive bonded to one face of said sheet in strips adjacent said edges to cover a minor portion of the surface of said one face, and one of said one face and the face opposite therefrom being treated at least in selected areas thereof for either enhancing the strength of the bond between said one face and said adhesive or enhancing the release characteristics to an adhesive placed in contact therewith.

16. The deflector as defined in claim 15 adapted to application to the inner panel of a vehicle door wherein said adhesive is disposed in strips adjacent said bottom edge and upwardly along said side edges over a major portion of the length thereof, and said adhesive is at spaced-apart intervals along said top edge.

17. The deflector as defined in claim 16 wherein said adhesive is continuous along said bottom edge.

18. The deflector as defined in claim 15 wherein the entire surface of said one face is treated for enhancing bonding of adhesive thereto.

19. The water deflector as defined in claim 15 wherein the entire surface of said opposite face is treated for enhancing release of an adhesive placed into contact therewith.

20. The deflector as defined in claim 15 including a plurality of spaced-apart holes in said sheet for receiving registration pins to place a plurality of superimposed sheets in registration with one another.

21. A reusable deflector for application to the inner panel of a vehicle door to prevent water or dust and the like from entering the vehicle body or coating the inner door trim panel, the deflector comprising:
a flat and flexible sheet of a plastic material having a peripheral shape generally matching the peripheral configuration of the inner panel of the vehicle door, said sheet having top, bottom and opposing side edges; permanently tacky pressure-sensitive adhesive bonded to a first face of said sheet, said layer being disposed in strips generally along said edges; at least one tab provided along said bottom edge adapted to be inserted into a slot in an associated inner door panel; and, a strip of plastic material having an adhesive coated face temporarily secured to said sheet in a first storage position and adapted to be secured to said sheet in a second position over said one tab when said one tab is inserted into a slot in an associated inner door panel.

22. The deflector as defined in claim 21 wherein said sheet is comprised of a polyvinyl chloride material.

23. The deflector as defined in claim 22 wherein said strip is comprised of an olefin plastic material.

24. The deflector as defined in claim 22 wherein said polyvinyl chloride is approximately 4 mils thick.

25. The deflector as defined in claim 21 wherein a second face of said sheet opposite said first face is coated with a release agent.

26. The deflector as defined in claim 21 wherein said adhesive layer is disposed in continuous strips adjacent said side edges and in discontinuous strips along said top and bottom edges.

27. The deflector as defined in claim 26 wherein said adhesive layer is in discontinuous blocks along said top edge, said adhesive layer being substantially continuous along said bottom edge and being absent only at said at least one tab.

28. The deflector as defined in claim 21 wherein a plurality of tabs are provided along the bottom surface of said sheet and a plurality of strips of plastic material are provided, one to overlie each tab.

29. A reusable deflector for application to a panel in a covering relationship with an opening therein to inhibit water or dust from passing therethrough, comprising:
a flat and flexible sheet of plastic material having a peripheral shape generally matching the peripheral configuration of at least some portion of a panel, said sheet having top, bottom and opposite side edges and a single permanently tacky pressure-sensitive adhesive bonded to one face of said sheet in a discontinuous strip adjacent said edges and covering a minor portion of the surface of said one face.

30. The deflector as defined in claim 29 wherein said sheet has a slip agent incorporated therein to facilitate separation of adjacent sheets placed in a stacked relationship relative thereto.

31. The deflector as defined in claim 29 wherein at least said one face of said sheet is treated for enhancing the bond between said adhesive an said one face.

32. A reusable deflector for application to a panel in a covering relationship with an opening therein to inhibit water or dust from passing therethrough, comprising:
a flat and flexible sheet of plastic material having a peripheral shape generally matching the peripheral configuration of at least some portion of a panel, said sheet having top, bottom and opposite side edges and a single permanently tacky pressure-sensitive adhesive bonded to one face of said sheet in discontinuous strips adjacent said edges and covering a minor portion of the surface of said one face.

33. The deflector as defined in claim 32 wherein said sheet has a slip agent incorporated therein to facilitate separation of adjacent sheets placed in a stacked relationship relative thereto.

34. The deflector as defined in claim 32 wherein at least said one face of said sheet is treated for enhancing the bond between said adhesive and said one face.

* * * * *

REEXAMINATION CERTIFICATE (1148th)
United States Patent [19]

Isaksen et al.

[11] B1 4,588,627

[45] Certificate Issued  * Oct. 24, 1989

[54] DEFLECTOR FOR VEHICLE BODY COMPONENTS

[75] Inventors: Robert A. Isaksen, Chardon; David E. Frappier, Chagrin Falls; Wallace R. Jones, Waite Hill Village, all of Ohio

[73] Assignee: The Excello Specialty Company, Ohio

Reexamination Request:
No. 90/001,532, Jun. 20, 1988

Reexamination Certificate for:
Patent No.: 4,588,627
Issued: May 13, 1986
Appl. No.: 606,900
Filed: May 3, 1984

[*] Notice: The portion of the term of this patent subsequent to Sep. 4, 2001 has been disclaimed.

Related U.S. Application Data

[63] Continuation-in-part of Ser. No. 415,228, Sep. 7, 1982, Pat. No. 4,469,732.

[51] Int. Cl.⁴ .......................... B32B 3/02; B32B 3/10
[52] U.S. Cl. .................................. 428/80; 296/39 R; 428/131; 428/187; 428/192; 428/194; 428/195; 428/343; 428/352
[58] Field of Search .................. 428/31, 40, 192, 194, 428/195, 80, 187, 343, 352; 106/18.11; 264/22

[56] References Cited

U.S. PATENT DOCUMENTS 4,377,626  3/1983  Kurowski .......................... 428/120
4,420,520  12/1983  Jones et al. ......................... 428/42

FOREIGN PATENT DOCUMENTS 2409669  7/1979  France .

Primary Examiner—Paul J. Thibodeau

[57] ABSTRACT

A deflector for securement to body components of a vehicle to prevent water, dust, and the like from entering the body or wetting inner trim panels. The deflector comprises a sheet of plastic peripherally shaped for covering at least a predetermined portion of a body component, and having permanently plastic and permanently tacky pressure-sensitive adhesive on selective areas thereof for attaching the sheet to the component.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21–28 is confirmed.

Claims 1–20, 29–34 are cancelled.

* * * * *